United States Patent
Wu et al.

(10) Patent No.: US 9,414,036 B2
(45) Date of Patent: Aug. 9, 2016

(54) WHITE BALANCE ADJUSTMENT METHOD FOR A DISPLAY DEVICE

(71) Applicant: SHENZHEN CHINA STAR OPTOELECTRONICS TECHNOLOGY CO., LTD., Shenzhen, Guangdong (CN)

(72) Inventors: Jinjun Wu, Guangdong (CN); Chao Ning, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/360,802

(22) PCT Filed: Apr. 18, 2014

(86) PCT No.: PCT/CN2014/075710
§ 371 (c)(1),
(2) Date: Jul. 17, 2015

(87) PCT Pub. No.: WO2015/157998
PCT Pub. Date: Oct. 22, 2015

(65) Prior Publication Data
US 2015/0312539 A1 Oct. 29, 2015

(30) Foreign Application Priority Data

Apr. 15, 2014 (CN) .......................... 2014 1 0151751

(51) Int. Cl.
*H04N 9/73* (2006.01)
*G09G 3/32* (2016.01)
(Continued)

(52) U.S. Cl.
CPC . *H04N 9/73* (2013.01); *G01J 3/505* (2013.01); *G09G 3/2003* (2013.01); *G09G 3/2074* (2013.01); *G09G 3/3208* (2013.01); *G09G 2320/0666* (2013.01)

(58) Field of Classification Search
CPC ......... G01J 3/505; H04N 9/73; G09G 3/3208; G09G 3/2074; G09G 3/2003; G09G 2320/0666

USPC ................ 345/589, 690, 77–88; 348/E9.052, 348/E5.041, 116–118
See application file for complete search history.

(56) References Cited

U.S. PATENT DOCUMENTS 4,970,653 A * 11/1990 Kenue ....................... G06T 7/00
   348/116
7,307,606 B1 * 12/2007 Yamazaki ............ G09G 3/2011
   315/169.3
(Continued)

FOREIGN PATENT DOCUMENTS

CN       101059936       10/2007
CN       101860764       10/2010
(Continued)

OTHER PUBLICATIONS

International Search Report for PCT/CN2014/075710, English translation attached to original, Both completed by the Chinese Patent Office on Dec. 30, 2014, Mailed Jan. 9, 2015, 8 Pages.

*Primary Examiner* — Kumar Patel
*Assistant Examiner* — Vinh Lam
(74) *Attorney, Agent, or Firm* — Brooks Kushman P.C.

(57) ABSTRACT

A white balance adjustment method for a display, the method including acquiring spectrum stimulus values of q gray scales of red, green, blue and white of a display panel of a tested display; determining spectrum stimulus value brightness of white and green, and performing interpolation segmenting on brightness of white and green; normalizing brightness of white and green; acquiring an ideal brightness normalized value of white and an ideal brightness normalized value of green; comparing the normalized value for brightness white and the ideal brightness normalized value corresponding to the white and the normalized value for brightness of green and the ideal brightness normalized value corresponding to the green respectively, based on the closest principle, and determining optimal gray scales of white and green; determining a target chromaticity, and changing the gray scales of red and blue, acquiring a RGBW combination which is closest to the target chromaticity.

10 Claims, 1 Drawing Sheet

(51) Int. Cl.
*G09G 3/20* (2006.01)
*G01J 3/50* (2006.01)

(56) References Cited

U.S. PATENT DOCUMENTS

| | | | |
|---|---|---|---|
| 7,791,621 B2 | 9/2010 | Lin | |
| 8,817,056 B2 | 8/2014 | Park | |
| 2003/0001958 A1* | 1/2003 | Hoshuyama | H04N 9/735 348/223.1 |
| 2004/0151373 A1* | 8/2004 | Wang | G06T 9/00 382/172 |
| 2009/0085926 A1 | 4/2009 | Kim et al. | |
| 2010/0259686 A1* | 10/2010 | Kao | H04N 9/73 348/658 |
| 2012/0268502 A1 | 10/2012 | Kurasawa et al. | |
| 2013/0083091 A1* | 4/2013 | Saitoh | G09G 3/36 345/690 |
| 2013/0293567 A1* | 11/2013 | Shigeta | G01J 3/506 345/589 |

FOREIGN PATENT DOCUMENTS

| | | |
|---|---|---|
| CN | 101860765 | 10/2010 |
| CN | 102063879 | 5/2011 |
| CN | 102394041 | 3/2012 |
| CN | 102402937 | 4/2012 |
| CN | 102542962 | 7/2012 |
| CN | 102749744 | 10/2012 |
| CN | 103314405 | 9/2013 |
| CN | 103366710 | 10/2013 |
| CN | 103366711 | 10/2013 |
| JP | 2007003848 | 1/2007 |
| JP | 2014033361 | 2/2014 |
| KR | 20060039460 | 5/2006 |
| TW | 201337901 | 9/2013 |
| WO | 2008096828 | 8/2008 |
| WO | 2013117005 | 8/2013 |

* cited by examiner

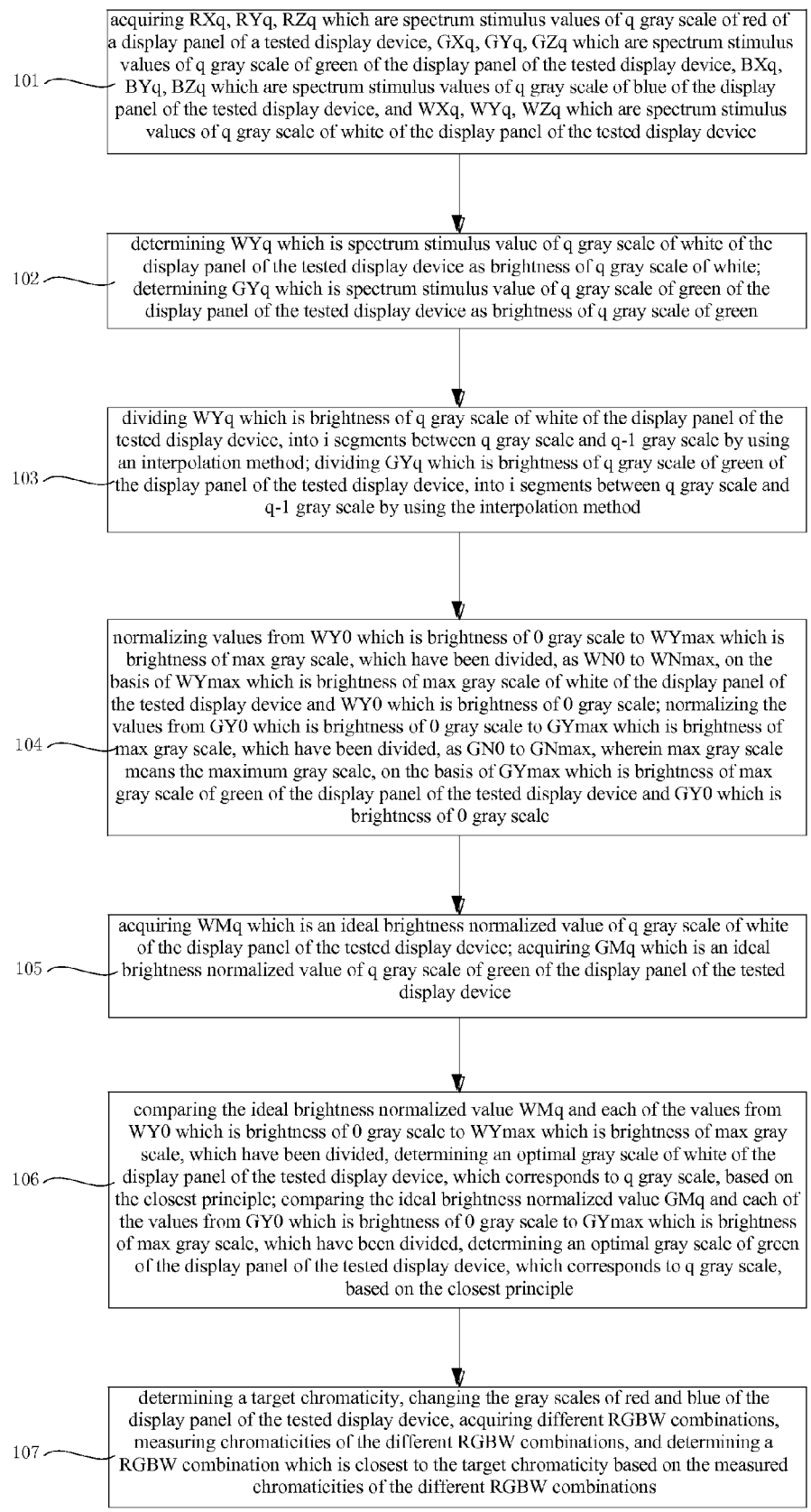

WHITE BALANCE ADJUSTMENT METHOD FOR A DISPLAY DEVICE

CROSS-REFERENCE TO RELATED APPLICATION

This application is the U.S. national phase of PCT Application No. PCT/CN2014/075710 filed on Apr. 18, 2014, which claims priority to Chinese Patent Application No. 201410151751.3 filed on Apr. 15, 2014, the disclosures of which are incorporated in their entirety by reference herein.

FIELD OF THE INVENTION

The present invention relates to a display device, more particularly, to a white balance adjustment method for the display device.

BACKGROUND OF THE INVENTION

In a conventional display device, such as a liquid crystal display device, an organic light-emitting diode (OLED) display device etc., all the displayed white field chromaticity coordinates have different levels of errors due to a displaying principle of the display device or a designing error of the display device.

With regard to the errors of white field chromaticity coordinates in a display device, if a corresponding with balance correction is not performed, color effects displayed among different display devices would have a relatively large difference. So the white balance correction generally needs to be performed in process of manufacturing display devices to make displaying color of each display device uniform.

The conventional display devices use red (R) sub-pixel, green (G) sub-pixel, blue (B) sub-pixel to display a picture. But in order to increase penetration rate, brightness and energy efficiency and to achieve energy conservation and environment protection, a display device which uses red (R) sub-pixel, green (G) sub-pixel, blue (B) sub-pixel and white (W) sub-pixel to display the picture has already been developed. Here, a white balance adjustment method for a display device based on the three sub-pixels, RGB, cannot be applied to a display device based on the four sub-pixels, RGBW.

SUMMARY OF THE INVENTION

A white balance adjustment method for a display device is provided in order to resolve the above conventional technical problems, which comprising: 1) acquiring $RX_q$, $RY_q$, $RZ_q$ which are spectrum stimulus values of q gray scale of red of a display panel of a tested display device, $GX_q$, $GY_q$, $GZ_q$ which are spectrum stimulus values of q gray scale of green of the display panel of the tested display device, $BX_q$, $BY_q$, $BZ_q$ which are spectrum stimulus values of q gray scale of blue of the display panel of the tested display device, and $WX_q$, $WY_q$, $WZ_q$ which are spectrum stimulus values of q gray scale of white of the display panel of the tested display device, wherein q is a gray level and is an integer, X, Y, Z are spectrum stimulus values of the display panel of the tested display device; 2) determining $WY_q$ which is spectrum stimulus value of q gray scale of white of the display panel of the tested display device as brightness of q gray scale of white; and determining $GY_q$ which is spectrum stimulus value of q gray scale of green of the display panel of the tested display device as brightness of q gray scale of green; 3) dividing $WY_q$ which is brightness of q gray scale of white of the display panel of the tested display device, into i segments between q gray scale and q−1 gray scale by using an interpolation method; and dividing $GY_q$ which is brightness of q gray scale of green of the display panel of the tested display device, into i segments between q gray scale and q−1 gray scale by using the interpolation method, wherein i is an integer that is not less than 2; 4) normalizing values from $WY_0$ which is brightness of 0 gray scale to brightness of max gray scale $WY_{max}$ which is brightness of max gray scale, which have been divided, as $WN_0$ to $WN_{max}$, on the basis of $WY_{max}$ which is brightness of max gray scale of white of the display panel of the tested display device and $WY_0$ which is brightness of 0 gray scale; and normalizing values from $GY_0$ which is brightness of 0 gray scale to $GY_{max}$ which is brightness of max gray scale, which have been divided, as $GN_0$ to $GN_{max}$, on the basis of $GY_{max}$ which is brightness of green max gray scale of green of the display panel of the tested display device and $GY_0$ which is brightness of 0 gray scale, wherein the max gray scale means the maximum gray scale; 5) acquiring $WM_q$ which is an ideal brightness normalized value of q gray scale of white of the display panel of the tested display device; and acquiring $GM_q$ which is an ideal brightness normalized value of q gray scale of green of the display panel of the tested display device; 6) comparing the ideal brightness normalized value $WM_q$ and each of the values from $WY_0$ which is brightness of 0 gray scale to $WY_{max}$ which is brightness of max gray scale, which have been divided, determining an optimal gray scale of white of the display panel of the tested display device, which corresponds to q gray scale, based on the closest principle; and comparing the ideal brightness normalized value $GM_q$ and each of the values from $GY_0$ which is brightness of 0 gray scale to $GY_{max}$ which is brightness of max gray scale, which have been divided, determining an optimal gray scale of green of the display panel of the tested display device, which corresponds to q gray scale, based on the closest principle; and 7) determining a target chromaticity, changing the red and blue gray scales of the display panel of the tested display device, acquiring different RGBW combinations, measuring chromaticities of the different RGBW combinations, and determining a RGBW combination which is closest to the target chromaticity based on the measured chromaticities of the different RGBW combinations.

Further, in the step 3), $WY_q$ which is brightness of q gray scale of white of the display panel of the tested display device may be divided between q gray scale and q−1 gray scale into:

$$WY_{q-1}, \left(\frac{WY_q - WY_{q-1}}{i} + WY_{q-1}\right)_{q-1+(1/i)},$$

$$\left(2\frac{WY_q - WY_{q-1}}{i} + WY_{q-1}\right)_{q-1+(2/i)},$$

$$\left(3\frac{WY_q - WY_{q-1}}{i} + WY_{q-1}\right)_{q-1+(3/i)}, \ldots, WY_q.$$

Further, in the step 3), $GY_q$ which is brightness of q gray scale of green (G) of the display panel of the tested display device may be divided between q gray scale and q−1 gray scale into:

$$GY_{q-1}, \left(\frac{GY_q - GY_{q-1}}{i} + GY_{q-1}\right)_{q-1+(1/i)},$$

$$\left(2\frac{GY_q - GY_{q-1}}{i} + GY_{q-1}\right)_{q-1+(2/i)},$$

-continued $$\left(3\frac{GY_q - GY_{q-1}}{i} + GY_{q-1}\right)_{q-1+(3/i)}, \ldots, GY_q.$$

Further, in the step 4), the values from $WY_0$, brightness of 0 gray scale to $WY_{max}$, brightness of max gray scale, which have been divided, may be normalized as $WN_0$ to $WN_{max}$ on the basis of $WY_{max}$ which is brightness of max gray scale of white of the display panel of the tested display device and $WY_0$ which is brightness of 0 gray scale in accordance with the following formula, $$WN_t = (WY_t - WY_0)/(WY_{max} - WY_0),$$

wherein the range of the value t is 0~max and $t=(m-1)/i$, where m is a positive integer.

Further, in the step 4), the values from $GY_0$, brightness of 0 gray scale to $GY_{max}$, brightness of max gray scale, which have been divided, may be normalized as $GN_0$ to $GN_{max}$ on the basis of $GY_{max}$ which is brightness of max gray scale of white of the display panel of the tested display device and $GY_0$ which is brightness of 0 gray scale in accordance with the following formula, $$GN_t = (GY_t - GY_0)/(GY_{max} - GY_0),$$

wherein the range of the value t is 0~max and $t=(m-1)/i$, where m is a positive integer.

Further, in the step 5), $WM_q$ which is the ideal brightness normalized value of q gray scale of white of the display panel of the tested display device may be acquired in accordance with the following formula;

$$WM_q = (q/\max)^E,$$

wherein E is a gamma value that ranges between 2.0 to 2.4.

Further, in the step 5), $GM_q$ which is the ideal brightness normalizing value of q gray scale of green of the display panel of the tested display device may be acquired in accordance with the following formula;

$$GM_q = (q/\max)^E,$$

wherein E is a gamma value that ranges between 2.0 to 2.4.

The white balance adjustment method for the display device according to the present invention can make the panel of the display device get a standard gamma value and a chromatic value.

BRIEF DESCRIPTION OF THE DRAWINGS

The above and other aspects, features and advantages of embodiments of the present invention will become more apparent from the following description taken in conjunction with the accompanying drawings in which:

FIG. 1 is a flowchart illustrating a white balance adjustment method for a display device according to an embodiment of the present invention.

DETAILED DESCRIPTION OF THE PREFERRED EMBODIMENT

The embodiment of the present invention will now be described more fully hereinafter with reference to the accompanying drawings. This invention may, however, be embodied in different forms and should not be construed as limited to the embodiments set forth herein. Rather, these embodiments are provided to explain the principle and actual application of the present invention, so that those skilled in the art will appreciate various embodiments of the present invention and various modifications adapted to certain expected applications.

FIG. 1 is a flowchart illustrating a white balance adjustment method for a display device according to an embodiment of the present invention.

Referring to FIG. 1, in step 101, $RX_q$, $RY_q$, $RZ_q$ which are spectrum stimulus values of q gray scale of red (R) of the display panel of the tested display device, $GX_q$, $GY_q$, $GZ_q$ which are spectrum stimulus values of q gray scale of green (G) of the display panel of the tested display device, $BX_q$, $BY_q$, $BZ_q$ which are spectrum stimulus values of q gray scale of blue (B) of the display panel of the tested display device, and $WX_q$, $WY_q$, $WZ_q$ which are spectrum stimulus values of q gray scale of white (W) of the display panel of the tested display device may be acquired, wherein q is gray level and is an integer, X, Y, Z are spectrum stimulus values of the display panel of the tested display device.

In step 102, $WY_q$ which is spectrum stimulus value of q gray scale of white (W) of the display panel of the tested display device may be determined as brightness of q gray scale of white (W); $GY_q$ which is spectrum stimulus value of q gray scale of green (G) of the display panel of the tested display device may be determined as brightness of q gray scale of green (G).

In step 103, $WY_q$ which is brightness of q gray scale of white (W) of the display panel of the tested display device, may be divided into i segments between q gray scale and q−1 gray scale by using an interpolation method, that is, dividing $WY_q$ which is brightness of q gray scale of white (W) of the display panel of the tested display device between q gray scale and q−1 gray scale as:

$$WY_{q-1}, \left(\frac{WY_q - WY_{q-1}}{i} + WY_{q-1}\right)_{q-1+(1/i)},$$

$$\left(2\frac{WY_q - WY_{q-1}}{i} + WY_{q-1}\right)_{q-1+(2/i)},$$

$$\left(3\frac{WY_q - WY_{q-1}}{i} + WY_{q-1}\right)_{q-1+(3/i)}, \ldots, WY_q;$$

$GY_q$ which is brightness of q gray scale of green (G) of the display panel of the tested display device, may be divided into i segments between q gray scale and q−1 gray scale by using the interpolation method, that is, dividing $GY_q$ which is brightness of q gray scale of green (G) of the display panel of the tested display device between q gray scale and q−1 gray scale as:

$$GY_{q-1}, \left(\frac{GY_q - GY_{q-1}}{i} + GY_{q-1}\right)_{q-1+(1/i)},$$

$$\left(2\frac{GY_q - GY_{q-1}}{i} + GY_{q-1}\right)_{q-1+(2/i)},$$

$$\left(3\frac{GY_q - GY_{q-1}}{i} + GY_{q-1}\right)_{q-1+(3/i)}, \ldots, GY_q.$$

In step 104, on the basis of $WY_{max}$ which is brightness of max (q=max) gray scale (that is, the maximum gray scale) of white (W) of the display panel of the tested display device and $WY_0$ which is brightness of 0 (q=0) gray scale (that is, the minimum gray scale), the values from $WY_0$, brightness of 0 gray scale to $WY_{max}$, brightness of max gray scale, which have been divided, may be normalized as $WN_0$ to $WN_{max}$ (that is, both of the number of gray scales which have been divided and that of brightness which correspond to its gray scales are i×max); on the basis of $GY_{max}$ which is brightness of max gray scale (that is, the maximum gray scale) of green (G) of the display panel of the tested display device and $GY_0$ which is brightness of 0 gray scale, the values from $GY_0$, brightness of 0 gray scale to $GY_{max}$, brightness of max gray scale, which have been divided, may be normalized as $GN_0$ to $GN_{max}$ (that is, both of the number of gray scales which have been divided and that of brightness which correspond to its gray scales are i×max).

In step 105, $WM_q$ which is the ideal brightness normalized value of q gray scale of white (W) of the display panel of the tested display device may be acquired; $GM_q$ which is the ideal brightness normalized value of q gray scale of green (G) of the display panel of the tested display device may be acquired.

In step 106, $WM_q$, the ideal brightness normalized value and each of $WN_0$ to $WN_{max}$ may be compared, and the optimal gray scale of white (W) of the display panel of the tested display device, which corresponds to q gray scale, may be determined, based on the closest principle; $GM_q$ and each of $GN_0$ to $GN_{max}$ may be compared, and the optimal gray scale of green (G) of the display panel of the tested display device, which corresponds to q gray scale, may be determined, based on the closest principle.

In step 107, the target chromaticity is determined, the gray scales of red (R) and blue (B) of the display panel of the tested display device are changed and different RGBW combinations are acquired so as to determine a RGBW combination which is closest to the target chromaticity.

The following is a detailed description for the above each steps assumes that the number of gray scales is 256 (namely, max=255).

In step 101, by using, for example, a color analyzer or a charge coupled device (CCD) and so on, $RX_q$, $RY_q$, $RZ_q$ which are spectrum stimulus values of red (R) q gray scale of the display panel of the tested display device, $GX_q$, $GY_q$, $GZ_q$ which are spectrum stimulus values of green (G) q gray scale of the display panel of the tested display device, $BX_q$, $BY_q$, $BZ_q$ which are spectrum stimulus values of blue (B) q gray scale of the display panel of the tested display device, and $WX_q$, $WY_q$, $WZ_q$ which are spectrum stimulus values of white (W) q gray scale of the display panel of the tested display device, may be acquired, wherein q is gray level and is an integer an range of which is 0 to 255, X, Y, Z are spectrum stimulus values of the display panel of the tested display device.

In step 102, $WY_q$ which is spectrum stimulus value of q gray scale of white (W) of the display panel of the tested display device, may be determined as brightness of q gray scale of white (W); $GY_q$ which is spectrum stimulus value of q gray scale of green (G) of the display panel of the tested display device, may be determined as brightness of q gray scale of green (G).

In step 103, $WY_q$ which is brightness of q gray scale of white (W) of the display panel of the tested display device, may be divided into i segments between q gray scale and q−1 gray scale by using the interpolation method; $GY_q$ which is brightness of q gray scale of green (G) of the display panel of the tested display device, may be divided into i segments between q gray scale and q−1 gray scale by using the interpolation method. In this embodiment, i may be taken as 8. It should be understood that i may be taken as a random integer that is not less than 2. As such, $WY_q$ which is brightness of q gray scale of white (W) of the display panel of the tested display device between q gray scale and q−1 gray scale, may be divided as:

$$WY_{q-1}, \left(\frac{WY_q - WY_{q-1}}{8} + WY_{q-1}\right)_{q-1+(1/8)},$$

$$\left(2\frac{WY_q - WY_{q-1}}{8} + WY_{q-1}\right)_{q-1+(2/8)},$$

$$\left(3\frac{WY_q - WY_{q-1}}{8} + WY_{q-1}\right)_{q-1+(3/8)}, \ldots, WY_q.$$

$GY_q$ which is brightness of q gray scale of green (G) of the display panel of the tested display device between q gray scale and q−1 gray scale, may be divided as:

$$GY_{q-1}, \left(\frac{GY_q - GY_{q-1}}{8} + GY_{q-1}\right)_{q-1+(1/8)},$$

$$\left(2\frac{GY_q - GY_{q-1}}{8} + GY_{q-1}\right)_{q-1+(2/8)},$$

$$\left(3\frac{GY_q - GY_{q-1}}{8} + GY_{q-1}\right)_{q-1+(3/8)}, \ldots, GY_q.$$

In step 104, in accordance with the following formula (1), on the basis of $WY_{255}$ which is brightness of 255 (q=255) gray scale (that is, the maximum gray scale) of white (W) of the display panel of the tested display device and $WY_0$ which is brightness of 0 (q=0) gray scale (that is, the minimum gray scale), the values from $WY_0$, brightness of 0 gray scale to $WY_{255}$, brightness of 255 gray scale, which have been divided, may be normalized as $WN_0$ to $WN_{255}$ (that is, both of the number of gray scales which have been divided and that of brightness which correspond to its gray scales are 2041), $$WN_t = (WY_t - WY_0)/(WY_{255} - WY_0) \tag{1}$$

Here, the range of the value t is 0~255 and t=(m−1)/8, where m is a positive integer.

In accordance with the following formula (2), on the basis of $GY_{255}$ which is brightness of 255 (q=255) gray scale (that is, the maximum gray scale) of green (G) of the display panel of the tested display device and $GY_0$ which is brightness of 0 (q=0) gray scale, the values from $GY_0$, brightness of 0 gray scale to $GY_{255}$, brightness of 255 gray scale, which have been divided, may be normalized as $GN_0$ to $GN_{255}$ (that is, both of the numbers of gray scales which have been divided and that of brightness which correspond to its gray scales are 2041), $$GN_t = (GY_t - GY_0)/(GY_{255} - GY_0) \tag{2}$$

Here, the range of the value t is 0~255 and t=(m−1)/8, where m is a positive integer.

In step 105, in accordance with the following formula (3), $WM_q$ which is the ideal brightness normalized value of q gray scale of white (W) of the display panel of the tested display device, may be acquired, $$WM_q = (q/255)^E \tag{3}$$

Here, q is an integer and the range of the value q is 0~255. E is a gamma value, generally ranging between 2.0 to 2.4, and it is preferably 2.2.

In accordance with the following formula (4), $GM_q$ which is the ideal brightness normalized value of q gray scale of green (G) of the display panel of the tested display device, may be acquired, $$GM_q = (q/255)^E \tag{4}$$

Here, q is integer and the range of the value q is 0~255. E is a gamma value, generally ranging between 2.0 to 2.4, and it has preferably 2.2.

In step 106, the ideal brightness normalized value $WM_0$ to the ideal brightness normalized value $WM_{255}$ and each of the values from $WY_0$, brightness of 0 gray scale to $WY_{255}$, brightness of 255 gray scale, which have been divided, may be compared, and the optimal gray scale of white (W) of the display panel of the tested display device, may be determined, based on the closest principle. For example, the differences between each value of $WN_0$ to $WN_{255}$ and $WM_q$ may be acquired and the t gray scale corresponding to the minimum absolute value of the difference $WN_t$ may be determined as the optimal gray scale of white (W) of the display panel of the tested display device, which corresponds to q gray scale. For instance, the difference between $WN_{111.625}$ and $WM_{112}$ is minimum, namely, 111.625 gray scale is determined as the optimal gray scale of white (W) of the display panel of the tested display device, which corresponds to 112 gray scale.

The ideal brightness normalized value $GM_0$ to the ideal brightness normalized value $GM_{255}$ and each of the values from $GY_0$, brightness of 0 gray scale to $GY_{255}$, brightness of 255 gray scale, which have been divided, may be compared, and the optimal gray scale of green (G) of the display panel of the tested display device, may be determined, based on the closest principle. For example, the differences between each value of $GN_0$ to $GN_{255}$ and $GM_q$ may be acquired and the t gray scale corresponding to the minimum absolute value of the difference $GN_t$ may be determined as the optimal gray scale of green (G) of the display panel of the tested display device, which corresponds to q gray scale. For instance, the difference between $GN_{211.625}$ and $WM_{212}$ is minimum, namely, 211.625 gray scale is determined as the optimal gray scale of green (G) of the display panel of the tested display device, which corresponds to 212 gray scale.

In step 107, the target chromaticity (for instance: x=0.28, y=0.29) may be determined, the gray scales of red (R) and blue (B) of the display panel of the tested display device may be changed, different RGBW combinations may be acquired, and the chromaticities of the different RGBW combinations may be obtained by a measurement. Then the RGBW combination which is closest to the target chromaticity can be determined according to the measured chromaticities of the different RGBW combinations.

While the present invention has been shown and described with reference to the specific embodiment, those skilled in the art will appreciate that various changes in form and details can be made therein without departing from the spirit and scope of the present invention as defined by the appended claims and their equivalents.

What is claimed is:

1. A white balance adjustment method for a display device, comprising:
   1) acquiring $RX_q$, $RY_q$, $RZ_q$ which are spectrum stimulus values of q gray scale of red of a display panel of a tested displayed device, $GX_q$, $GY_q$, $GZ_q$ which are spectrum stimulus values of q gray scale of green of the display panel of the tested display device, $BX_q$, $BY_q$, $BZ_q$ which are spectrum stimulus values of q gray scale of blue of the display panel of the tested display device, and $WX_q$, $WY_q$, $WZ_q$ which are spectrum stimulus values of q gray scale of white of the display panel of the tested display device, wherein q is a gray level and is an integer, X, Y, Z are spectrum stimulus values of the display panel of the tested display device;
   2) determining $WY_q$ which is spectrum stimulus value of q gray scale of white of the display panel of the tested display device as brightness of q gray scale of white; and determining $GY_q$ which is spectrum stimulus value of q gray scale of green of the display panel of the tested display device as brightness of q gray scale of green;
   3) dividing $WY_q$ which is brightness of q gray scale of white of the display panel of the tested display device, into i segments between q gray scale and q−1 gray scale by using an interpolation method; and dividing $GY_q$ which is brightness of q gray scale of green of the display panel of the tested display device, into i segments between q gray scale and q−1 gray scale by using the interpolation method, wherein i is an integer that is not less than 2;
   4) normalizing values from $WY_0$ which is brightness of 0 gray scale to $WY_{max}$ which is brightness of max gray scale, which have been divided, as $WN_0$ to $WN_{max}$, on the basis of $WY_{max}$ which is brightness of max gray scale of white of the display panel of the tested display device and $WY_0$ which is brightness of 0 gray scale; and normalizing values from $GY_0$ which is brightness of 0 gray scale to $GY_{max}$ which is brightness of max gray scale, which have been divided, as $GN_0$ to $GN_{max}$, on the basis of $GY_{max}$ which is brightness of max gray scale of green of the display panel of the tested display device and $GY_0$ which is brightness of 0 gray scale, wherein the max gray scale means the maximum gray scale;
   5) acquiring $WM_q$ which is an ideal brightness normalized value of q gray scale of white of the display panel of the tested display device; and acquiring $GM_q$ which is an ideal brightness normalized value of q gray scale of green of the display panel of the tested display device;
   6) comparing the ideal brightness normalized value $WM_q$ and each of the values from $WY_0$ which is brightness of 0 gray scale to $WY_{max}$ which is brightness of max gray scale, which have been divided, determining an optimal gray scale of white of the display panel of the tested display device, which corresponds to q gray scale, based on a closest principle; and comparing the ideal brightness normalized value $GM_q$ and each of the values from $GY_0$ which is brightness of 0 gray scale to $GY_{max}$ which is brightness of max gray scale, which have been divided, determining an optimal gray scale of green of the display panel of the tested display device, which corresponds to q gray scale, based on the closest principle; and
   7) determining a target chromaticity, changing the gray scales of red and blue of the display panel of the tested display device, acquiring different RGBW combinations, measuring a chromaticity of the different RGBW combinations, and determining a RGBW combination which is closest to the target chromaticity based on the measured chromaticities of the different RGBW combinations.

2. The method of claim 1, wherein, in the step 3), $WY_q$ which is brightness of q gray scale of white of the display panel of the tested display device is divided between q gray scale and q−1 gray scale into:

$$WY_{q-1}, \left(\frac{WY_q - WY_{q-1}}{i} + WY_{q-1}\right)_{q-1+(1/i)},$$

$$\left(2\frac{WY_q - WY_{q-1}}{i} + WY_{q-1}\right)_{q-1+(2/i)},$$

$$\left(3\frac{WY_q - WY_{q-1}}{i} + WY_{q-1}\right)_{q-1+(3/i)}, \ldots, WY_q.$$

3. The method of claim 1, wherein, in the step 3), $GY_q$ which is brightness of q gray scale of green (G) of the display panel of the tested display device is divided between q gray scale and q−1 gray scale into:

$$GY_{q-1}, \left(\frac{GY_q - GY_{q-1}}{i} + GY_{q-1}\right)_{q-1+(1/i)},$$
$$\left(2\frac{GY_q - GY_{q-1}}{i} + GY_{q-1}\right)_{q-1+(2/i)},$$
$$\left(3\frac{GY_q - GY_{q-1}}{i} + GY_{q-1}\right)_{q-1+(3/i)}, \ldots, GY_q.$$

4. The method of claim 2, wherein, in the step 3), $GY_q$ which is brightness of q gray scale of green (G) of the display panel of the tested display device is divided between q gray scale and q−1 gray scale into:

$$GY_{q-1}, \left(\frac{GY_q - GY_{q-1}}{i} + GY_{q-1}\right)_{q-1+(1/i)},$$
$$\left(2\frac{GY_q - GY_{q-1}}{i} + GY_{q-1}\right)_{q-1+(2/i)},$$
$$\left(3\frac{GY_q - GY_{q-1}}{i} + GY_{q-1}\right)_{q-1+(3/i)}, \ldots, GY_q.$$

5. The method of claim 1, wherein, in the step 4), the values from $WY_0$, brightness of 0 gray scale to $WY_{max}$, brightness of max gray scale, which have been divided, are normalized as $WN_0$ to $WN_{max}$ on the basis of $WY_0$ which is brightness of max gray scale of white of the display panel of the tested display device and $WY_0$ which is brightness of 0 gray scale in accordance with the following formula, $$WN_t = (WY_t - WY_0)/(WY_{max} - WY_0),$$

wherein the range of the value t is 0~max and t=(m−1)/i, where m is a positive integer.

6. The method of claim 1, wherein, in the step 4), the values from $GY_0$, brightness of 0 gray scale to $GY_{max}$, brightness of max gray scale, which have been divided, are normalized as $GN_0$ to $GN_{max}$ on the basis of $GY_{max}$ which is brightness of max gray scale of white of the display panel of the tested display device and $GY_0$ which is brightness of 0 gray scale in accordance with the following formula, $$GN_t = (GY_t - GY_0)/(GY_{max} - GY_0),$$

wherein the range of the value t is 0~max and t=(m−1)/i, where m is a positive integer.

7. The method of claim 5, wherein, in the step 4), the values from $GY_0$, brightness of 0 gray scale to $GY_{max}$, brightness of max gray scale which have been divided, are normalized as $GN_0$ to $GN_{max}$ on the basis of $GY_{max}$ which is brightness of max gray scale of white of the display panel of the tested display device and $GY_0$ which is brightness of 0 gray scale in accordance with the following formula, $$GN_t = (GY_t - GY_0)/(GY_{max} - GY_0),$$

wherein the range of the value t is 0~max and t=(m−1)/i, where m is a positive integer.

8. The method of claim 1, wherein, in the step 5), $WM_q$ which is the ideal brightness normalized value of q gray scale of white of the display panel of the tested display device is acquired in accordance with the following formula, $$WM_q = (q/\max)^E,$$

wherein E is a gamma value that ranges between 2.0 to 2.4.

9. The method of claim 1, wherein, in the step 5), $GM_q$ which is the ideal brightness normalized value of q gray scale of green of the display panel of the tested display device is acquired in accordance with the following formula, $$GM_q = (q/\max)^E,$$

wherein E is a gamma value that ranges between 2.0 to 2.4.

10. The method of claim 8, wherein, in the step 5), $GM_q$ which is the ideal brightness normalized value of q gray scale of green of the display panel of the tested display device is acquired in accordance with the following formula, $$GM_q = (q/\max)^E,$$

wherein E is a gamma value that ranges between 2.0 to 2.4.

* * * * *